(12) United States Patent
Scekic et al.

(10) Patent No.: US 8,133,147 B2
(45) Date of Patent: Mar. 13, 2012

(54) CLUTCH

(75) Inventors: Vladimir Scekic, New Westminster (CA); John Colbourne, St. Albert (CA)

(73) Assignee: MiVa Engineering Ltd., New Westminister (CA)

(*) Notice: Subject to any disclaimer, the term of this patent is extended or adjusted under 35 U.S.C. 154(b) by 274 days.

(21) Appl. No.: 12/470,045

(22) Filed: May 21, 2009

(65) Prior Publication Data

US 2009/0291799 A1 Nov. 26, 2009

Related U.S. Application Data

(60) Provisional application No. 61/055,866, filed on May 23, 2008.

(51) Int. Cl.
 *F16H 3/74* (2006.01)
(52) U.S. Cl. .................................................. 475/257
(58) Field of Classification Search .................. 475/204, 475/257, 311
See application file for complete search history.

(56) References Cited

U.S. PATENT DOCUMENTS

| | | | | |
|---|---|---|---|---|
| 3,405,571 A | * | 10/1968 | Mersch | 475/5 |
| 4,138,907 A | * | 2/1979 | Melles | 475/74 |
| 5,505,668 A | | 4/1996 | Koriakov-Savoysky | |
| 5,558,173 A | * | 9/1996 | Sherman | 180/53.8 |
| 5,971,880 A | * | 10/1999 | Keiser | 475/83 |
| 6,801,842 B2 | * | 10/2004 | Egami et al. | 701/36 |
| 7,101,307 B2 | * | 9/2006 | Clauson | 477/2 |
| 2008/0039263 A1 | * | 2/2008 | Usoro | 475/157 |

* cited by examiner

*Primary Examiner* — Justin Holmes
(74) *Attorney, Agent, or Firm* — Oyen Wiggs Greem & Mutala LLP

(57) ABSTRACT

A clutching device that achieves torque modulation and/or speed trimming by manipulating only a fraction of torque transferred, but over a wider speed range, is provided. The clutching device has a planetary gear set connected to a prime mover. The planetary gear set includes a ring gear, a planet carrier with at least one planet and one sun gear disposed in the planet carrier the said planet gear engaged at one side with the ring gear, and at the other side with the sun gear. The device further includes a modulating device connected to the sun gear, and an output device connected to the planet carrier. Speed modulation between the prime mover and the output device is controlled by controlling the speed of rotation of the sun gear. Energy from the speed modulation is recoverable by the modulating device.

12 Claims, 2 Drawing Sheets

CLUTCH

RELATED APPLICATION

This application claims priority to, and incorporates by reference in its entirety, U.S. provisional application No. 61/055,866 filed 23 May 2008.

TECHNICAL FIELD

This invention relates to power transmission devices and, more particularly, to clutching devices that can achieve torque modulation and/or speed trimming, by manipulating only a fraction of torque transferred, but over a wider speed range.

BACKGROUND

In automotive and various industrial applications, it is often necessary to provide a clutching/speed-trimming device that is used to connect or disconnect a prime mover to or from the rest of a powertrain and/or auxiliary devices. It is also often important to be able to continuously change the speed-ratio between the prime-mover and the driven equipment, whether they are main propulsion or powertrain devices, or auxiliary devices such as, but not limited to, cooling fans, pumps, compressors and the like. Ideally, the speed ratio can be changed while the system is running and without interrupting the torque path. These functions are particularly important, but not limited to, applications where an internal combustion engine is the prime mover. The process of connecting the torque path is typically referred to as "clutching" while the process of interrupting the torque path is typically referred to as "declutching." The process of changing the speed ratio between the prime mover and auxiliary devices may be referred to as "speed trimming" or "speed modulation."

Most conventional clutching devices utilize either friction (e.g. mechanical clutches) or hydraulics (e.g. fluid couplings and torque converters) in order to establish and interrupt the torque path. Magnetic clutches and couplings are gaining in popularity especially in certain industrial application but their more widespread application is limited by cost and envelope size compared to frictional and hydraulic assemblies.

During clutch engagement, the rotational speed of the driven equipment is gradually increased from zero, or another finite rotational speed lower than the rotational speed of the prime mover, to the rotational speed of the prime mover. This process of speeding up the driven equipment is referred to as "clutch modulation." Energy from clutch modulation in traditional clutching devices is converted into heat, which is typically released into the atmosphere. Traditional clutches therefore have limited modulating capacity and/or, in the case of hydraulic systems, rather low operating efficiency. In cases where it may be necessary to provide speed trimming and/or torque modulation for extended periods of time, yet achieve high efficiency once clutched, typically two clutching devices are used: a hydraulic unit to provide for modulation, and a friction unit to achieve full clutch engagement (e.g. lock-up torque converters) once the driven equipment is sped-up.

Traditionally, clutching devices modulate the entire working torque over a speed range equal to the difference between the speed of the prime mover and the starting speed of the process machine. Therefore, clutches have a tendency of being rather large and it is difficult to achieve and automate smooth, repeatable modulation. This is especially true with friction-based clutches because coefficient of friction may change during the modulation.

There is a need for a clutching device that is smaller and more cost-effective than conventional, friction-based clutches. There is also a need for a clutching device capable of providing smooth, repeatable modulation, unrestricted in duration, and easy to automate regardless of operating conditions. Furthermore, there is a need for a clutching device capable of converting the energy of clutch modulation into an energy form that can be readily recovered and/or reintroduced into the system to provide improved efficiency of the system even when the clutch is modulating for extended periods of time.

SUMMARY OF THE INVENTION

In one aspect, the invention provides a clutching device that includes a planetary gear set connected to a prime mover. The planetary gear set includes a ring gear, a planet carrier with at least one planet and one sun gear disposed in the planet carrier the said planet gear engaged at one side with the ring gear, and at the other side with the sun gear. The device further includes a modulating device connected to the sun gear, and an output device connected to the planet carrier. Speed modulation between the prime mover and the output device is controlled by controlling the speed of rotation of the sun gear. Energy from the speed modulation is recoverable by the modulating device.

BRIEF DESCRIPTION OF DRAWINGS

In drawings which show non-limiting embodiments of the invention.

LIST OF PARTS

| Reference number | Part |
|---|---|
| 1 | ring gear |
| 2 | planet carrier |
| 3 | planet gear |
| 4 | planet pin |
| 5 | bearing |
| 6 | spacer |
| 7 | retaining ring |
| 8 | spring pin |
| 9 | bearing |
| 10 | bearing |
| 11 | spacer |
| 12 | sun gear |
| 13 | plate |
| 14 | cover |
| 15 | output device |
| 16 | O-ring |
| 17 | O-ring |
| 18 | lock washer |
| 19 | cap screw |
| 20 | seal |
| 21 | bearing |
| 22 | bearing holder |
| 23 | pump plate |
| 24 | pump |
| 25 | splined collar |
| 26 | spacer |
| 27 | dowel |
| 100 | clutching device |

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Also, for reasons of simplicity and clarity of explanation, the following description will focus on clutching devices for driving auxiliary equipment. It will be appreciated, however, that the clutching devices and underlying principals described herein can be applied in a variety of different industrial, marine, and other applications including the main drive of propulsion systems.

Figure 1:
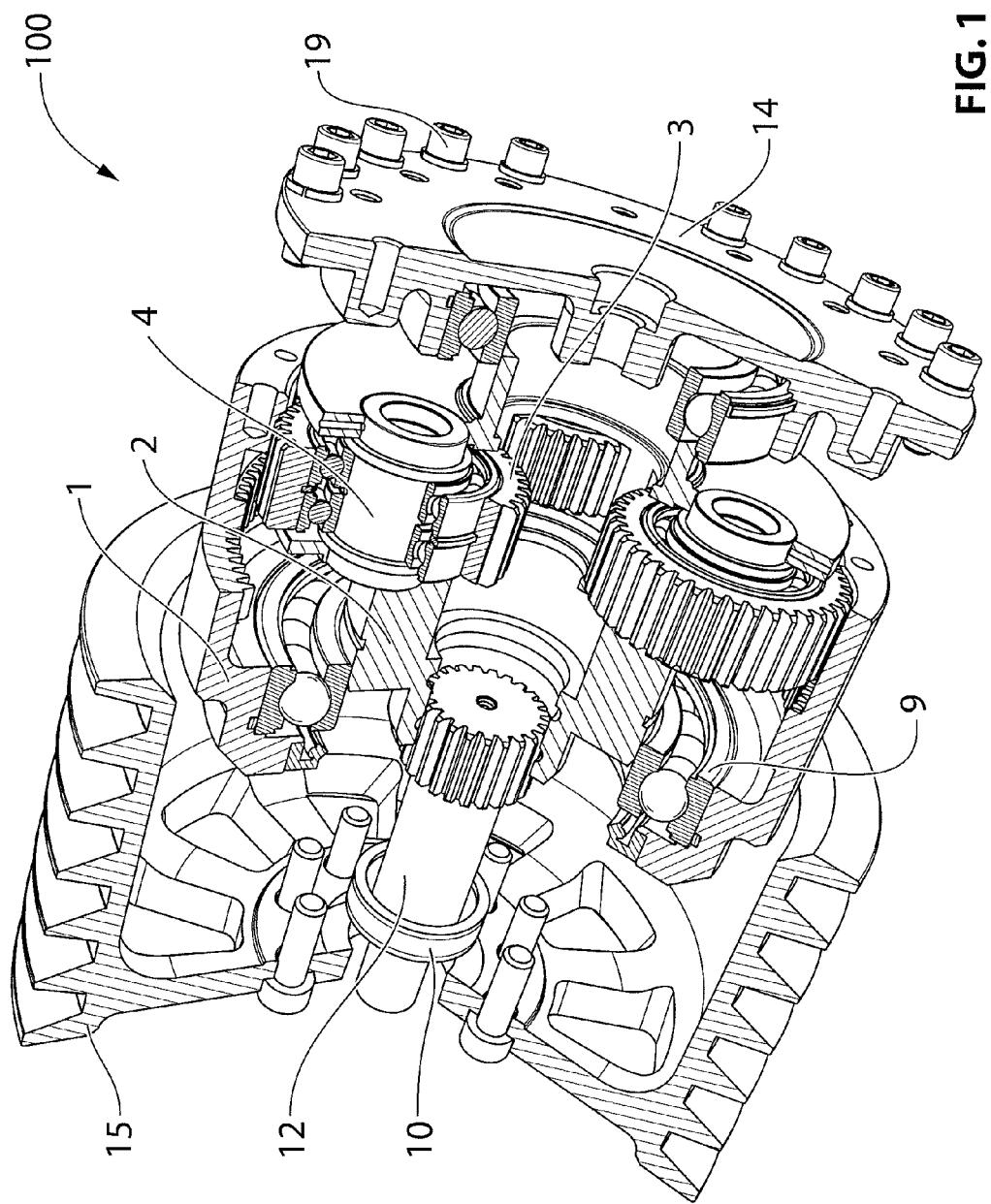
FIG. 1 is a cut-out, partially exploded view of a clutching device according to one embodiment of the invention (modulating device not shown)
Figure 2:
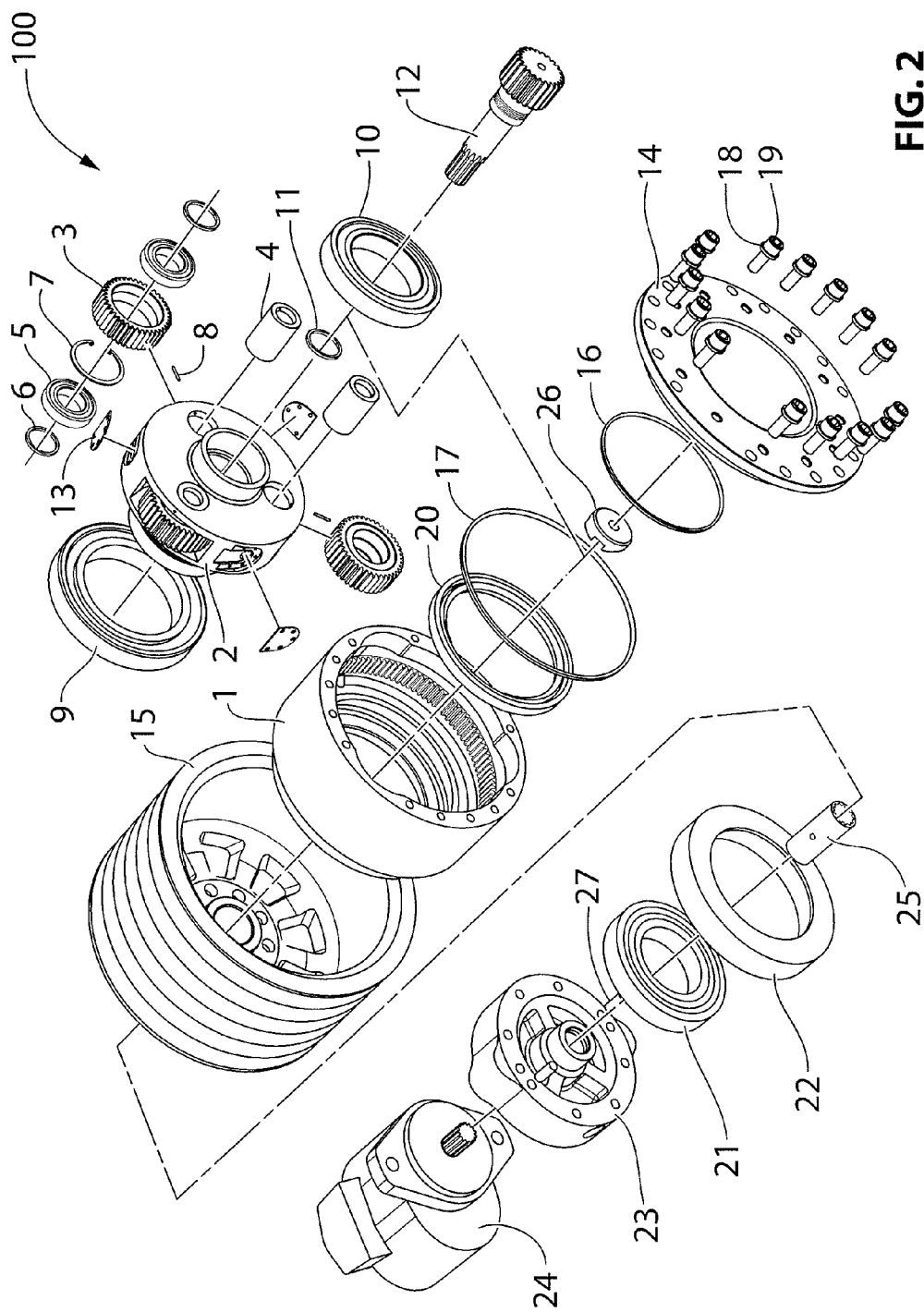
FIG. 2 is an exploded view of the embodiment shown in FIG. 1 (modulating device shown).

FIGS. 1 and 2 show a clutching device according to one embodiment of the present invention. clutching device 100 has a cover 14 connected to the front-end of an engine crankshaft (not shown) by means of an adapter (also not shown). Cover 14 is the input of clutching device 100, and is connected to ring gear 1. Ring gear 1 is engaged with planet gears 3. Planet gears 3 are mounted in planet carrier 2 by means of bearings 5 and pins 4, and are also engaged with sun gear 12. An output device 15 is rigidly connected to planet carrier 2 and is the output of the assembly. Output device 15 may, for example, be a sheave or a sprocket. Output device 15 drives auxiliary equipment such as cooling fans, generators, pumps, compressors and the like. Where output device 15 drives the main drive of propulsion systems, output device 15 may be a shaft, for example.

Sun gear 12 is connected to a modulating device 24 used to provide the control (reaction) torque for torque modulation. Modulating device 24 may, for example, be a hydraulic pump, a hydraulic motor, an electrical generator, an electrical motor, a friction clutch, a hydraulic coupling device, a magnetic coupling device, or the like.

Rotational power of the crankshaft is transferred to output device 15 such that in operation, the correlation of the rotational speeds of cover 14, sun gear 12 and output device 15 satisfy the following equation:

$$(N_{ring}/N_{sun})*W_{in}=(1+N_{ring}/N_{sun})*W_{out}-W_{sun} \quad (1)$$

where $N_{ring}$ and $N_{sun}$ are the numbers of teeth on ring gear 1 and sun gear 12, respectively, and $W_{in}$, $W_{out}$ and $W_{sun}$ are the rotational speeds of cover 14, output device 15, and sun gear 12, respectively. An arrangement where the planet carrier is connected to the crankshaft, and ring gear is connected to the output device is also possible, but the system still has to satisfy Equation (1).

When sun gear 12 is held stationary, output device 15 will be at "synchronous" speed that satisfies the equation:

$$W_{out-sync}=N_{ring}/(N_{sun}+N_{ring})*W_{in} \quad (2)$$

In order to slow output device 15 below the synchronous speed, the torque of modulating device 24 is lowered (e.g. if the modulating device is a hydraulic pump, by reducing the discharge pressure or volume of the pump). This will cause sun gear 12 to spin in the direction opposite of ring gear 1 and planet carrier 2. The correlation of the rotational speeds of cover 14, sun gear 12 and output device 15 are given in Equation (1).

Output device 15 may also be sped up above the synchronous speed by driving sun gear 12 in the same direction of rotation as ring gear 1 and planet carrier 2. To achieve this, modulating device 24 must act as a motor, where motive power may be provided from an external source (not shown). Again, the correlation of the rotational speeds of cover 14, sun gear 12 and output device 15 are given in Equation (1).

Those skilled in the art will understand that the foregoing examples of epicyclical gear systems may be substituted with a cycloidal (orbital) gear systems in which case the rotational speeds have to satisfy the following equation:

$$N_{ring}*W_{in}=N_{pinion}*W_{out}+W_{ecc} \quad (3)$$

where $N_{ring}$ and $N_{pinion}$ are the numbers of teeth on a ring gear and a pinion, respectively, and $W_{in}$, $W_{out}$ and $W_{ecc}$ are the rotational speeds of a input crankshaft, an output device, and an eccentric shaft, respectively.

Those skilled in the arts will also understand that, if and where appropriate, and that in the case of an orbital arrangement, multiple, axially split pinions may be used for better balance of the clutching device. Also, in cases where the modulation energy is limited, but smoothness of operation and cost are important, a hydraulic pump may be substituted with a friction clutch.

Finally, those skilled in the arts will understand that an "in-line" torque transmission system can be achieved (such as between an engine and gearbox in a vehicle), in which case a "hollow" sun gear must be used. In this case the planet carrier will be connected to an output shaft, which will pass through the hollow sun gear and will connect to the driven equipment.

As will be apparent to those skilled in the art in the light of the foregoing disclosure, many alterations and modifications are possible in the practice of this invention without departing from the spirit or scope thereof.

We claim:

1. A clutching device for modulating the speed of an output device, the clutching device comprising:
   a planetary gear set directly connectable to a crankshaft of a prime mover, the planetary gear set comprising:
   a ring gear comprising a first end and a second end, the first end rigidly fixed to a cover rigidly fixable to the crankshaft;
   at least one planet gear engaged with the ring gear;
   a planet carrier comprising a first end and a second end, the first end housing the at least one planet gear;
   a first bearing abuttingly and supportingly disposed between an inner surface of the second end of the ring gear and an outer surface of the second end of the planet carrier, the first bearing having an inner diameter, wherein the second end of the planet carrier is rigidly fixable to the output device by an arrangement of a plurality of fastening bolts receivable in the second end of the planet carrier,
   wherein a width of the arrangement is less than the inner diameter of the first bearing;
   a sun gear disposed in the planet carrier and engaged with the at least one planet gear, wherein the sun gear is connectable to a modulating device,
   whereby the planetary gear set and the output device are supportingly mountable on the crankshaft;
   wherein speed modulation between the prime mover and the output device is controllable by controlling speed of rotation of the sun gear, whereby energy from the speed modulation is recoverable by the modulating device.

2. A clutching device according to claim 1,
   wherein the planetary gear set comprises a second bearing abuttingly and supportingly disposed between the cover and an outer surface of the first end of the planet carrier, whereby the first bearing and the second bearing are located to balance load from the output device.

3. A clutching device according to claim 2 wherein the modulating device is selected from the group consisting of a hydraulic pump, a friction clutch, a hydraulic coupling device and a magnetic coupling device.

4. A clutching device according to claim 3, wherein the output device is a sheave or a sprocket.

5. A clutching device according to claim 4 wherein the output device is connected to an auxiliary device.

6. A clutching device according to claim 5 wherein the auxiliary device is selected from the group consisting of a cooling fan, a pump, a generator and a compressor.

7. A clutching device for modulating the speed of an output device, the clutching device comprising:
- a planetary gear set directly connectable to a crankshaft of a prime mover, the planetary gear set comprising:
  - a ring gear comprising a first end and a second end, the first end rigidly fixable to the crankshaft;
  - at least one planet gear engaged with the ring gear;
  - a planet carrier comprising a first end and a second end, the first end housing the at least one planet gear;
  - a first bearing abuttingly and supportingly disposed between an inner surface of the second end of the ring gear and an outer surface of the second end of the planet carrier, the first bearing having an inner diameter, wherein the second end of the planet carrier is rigidly fixable to the output device by an arrangement of a plurality of fastening bolts receivable in the second end of the planet carrier, wherein a width of the arrangement is less than the inner diameter of the first bearing;
  - a sun gear disposed in the planet carrier and engaged with the at least one planet gear, wherein the sun gear is connectable to a modulating device, whereby the planetary gear set and the output device are supportingly mountable on the crankshaft;

wherein speed modulation between the prime mover and the output device is controllable by controlling speed of rotation of the sun gear, whereby energy from the speed modulation is recoverable by the modulating device.

8. A clutching device according to claim 7, wherein the planetary gear set further comprises:
- an adapter comprising a first end and a second end, the first end of the adapter rigidly fixable to the crankshaft, and the second end of the adapter rigidly fixed to the first end of the ring gear; and
- a second bearing abuttingly and supportingly disposed between the second end of the adapter and an outer surface of the first end of the planet carrier, whereby the first bearing and the second bearing are located to balance load from the output device.

9. A clutching device according to claim 8 wherein the modulating device is selected from the group consisting of a hydraulic pump, a friction clutch, a hydraulic coupling device and a magnetic coupling device.

10. A clutching device according to claim 9, wherein the output device is a sheave or a sprocket.

11. A clutching device according to claim 10 wherein the output device is connected to an auxiliary device.

12. A clutching device according to claim 11 wherein the auxiliary device is selected from the group consisting of a cooling fan, a pump, a generator and a compressor.

* * * * *